United States Patent
Liu

(10) Patent No.: US 9,689,186 B2
(45) Date of Patent: Jun. 27, 2017

(54) HINGE AND ELECTRONIC DEVICE

(71) Applicant: Lenovo (Beijing) Co., Ltd., Beijing (CN)

(72) Inventor: Xiangtao Liu, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 157 days.

(21) Appl. No.: 14/671,118

(22) Filed: Mar. 27, 2015

(65) Prior Publication Data

US 2016/0123059 A1 May 5, 2016

(30) Foreign Application Priority Data

Nov. 3, 2014 (CN) .......................... 2014 1 0608493

(51) Int. Cl.
| | |
|---|---|
| *F04D 15/00* | (2006.01) |
| *H02K 7/14* | (2006.01) |
| *E05D 11/08* | (2006.01) |
| *E05D 3/02* | (2006.01) |
| *G06F 1/16* | (2006.01) |

(52) U.S. Cl.
CPC .............. *E05D 11/082* (2013.01); *E05D 3/02* (2013.01); *G06F 1/1616* (2013.01); *G06F 1/1681* (2013.01); *E05D 2011/088* (2013.01); *E05Y 2201/25* (2013.01); *E05Y 2201/254* (2013.01); *E05Y 2900/606* (2013.01)

(58) Field of Classification Search
CPC ........... E05Y 2201/21; E05Y 2201/254; E05Y 2201/266; E05Y 2900/531; E05Y 2201/25; E05Y 2201/234; E05Y 2201/256; E05Y 2201/264; E05Y 2400/21; E05Y 2800/10; E05Y 2800/11; E05Y 2900/518; E05Y 2900/606
USPC ............................ 318/3, 362; 16/51, 52, 320
See application file for complete search history.

(56) References Cited

U.S. PATENT DOCUMENTS 3,686,708 A * 8/1972 DiNoia .................. B60N 2/522
                                                    16/51
3,872,541 A * 3/1975 Peterson ............. E05D 11/0081
                                                   16/223
(Continued)

FOREIGN PATENT DOCUMENTS

| CN | 101017384 A | 8/2007 |
| CN | 101718324 A | 6/2010 |

(Continued)

OTHER PUBLICATIONS

First Chinese Office Action regarding Application No. 201410608493.7 dated Aug. 3, 2016. English translation provided by Unitalen Attorneys at Law.

*Primary Examiner* — Paul Ip
(74) *Attorney, Agent, or Firm* — Harness, Dickey & Pierce, P.L.C.

(57) ABSTRACT

A hinge and an electronic device are provided according to the present application. The hinge includes a spindle, a spindle sleeve arranged with respect to the spindle, and a first material with a variable state arranged between the spindle and the spindle sleeve, and a torsion of the spindle is variable according to the variable state of the first material. The electronic device includes the hinge, a first body and a second body; and the first body and the second body are rotatably connected via the hinge.

17 Claims, 4 Drawing Sheets

(56) References Cited

U.S. PATENT DOCUMENTS

| | | | | |
|---|---|---|---|---|
| 3,952,365 | A * | 4/1976 | Grisebach | E02F 9/006 16/52 |
| 6,084,495 | A * | 7/2000 | Ripingale | G01V 15/00 335/284 |
| 6,304,163 | B1 * | 10/2001 | Rippingale | G01V 15/00 324/326 |
| 6,314,612 | B1 * | 11/2001 | Rennecke | E05D 11/1028 16/51 |
| 7,555,816 | B2 * | 7/2009 | Walker | B60P 3/14 16/269 |
| 8,576,034 | B2 * | 11/2013 | Bilbrey | H01R 13/6205 335/285 |
| 2003/0006109 | A1 | 1/2003 | Ogura et al. | |
| 2006/0191105 | A1 * | 8/2006 | Walker | B60P 3/14 16/355 |
| 2008/0010776 | A1 | 1/2008 | Kaneko et al. | |
| 2008/0150458 | A1 * | 6/2008 | Ryynanen | F16F 15/03 318/362 |
| 2008/0239672 | A1 * | 10/2008 | Ghoshal | G06F 1/203 361/701 |
| 2008/0272615 | A1 * | 11/2008 | McKnight | F15D 1/10 296/180.5 |
| 2009/0025181 | A1 * | 1/2009 | Burger | E05F 1/1215 16/286 |
| 2012/0028480 | A1 * | 2/2012 | Bilbrey | H01R 13/6205 439/39 |
| 2012/0272480 | A1 * | 11/2012 | Ac | E05D 11/082 16/320 |
| 2013/0329360 | A1 * | 12/2013 | Aldana | G06F 1/1626 361/679.56 |
| 2014/0098474 | A1 * | 4/2014 | Bhowmik | G06F 1/1616 361/679.01 |
| 2015/0022442 | A1 * | 1/2015 | Hwang | G06F 1/1681 345/156 |
| 2015/0360442 | A1 * | 12/2015 | Rappoport | B29C 43/146 428/172 |

FOREIGN PATENT DOCUMENTS

| | | |
|---|---|---|
| CN | 201582341 U | 9/2010 |
| CN | 102052423 A | 5/2011 |
| CN | 102562923 A | 7/2012 |
| CN | 203717619 U | 7/2014 |

* cited by examiner

HINGE AND ELECTRONIC DEVICE

This application claims the benefit of priority to Chinese Patent Application No. 201410608493.7 titled "HINGE AND ELECTRONIC DEVICE", filed with the Chinese State Intellectual Property Office on Nov. 3, 2014, the entire disclosure of which is incorporated herein by reference

TECHNICAL FIELD

The present application relates to the field of rotation technique, and specifically to a hinge and an electronic device.

BACKGROUND

A hinge is a device configured to connect two different components to enable the two components to be rotatable around the hinge.

In the related technology, the hinge is generally a mechanical device, which includes a spindle and a fixing component arranged outside the spindle. The spindle may rotate around the fixing component. The hinge has wide application scenarios, and presently is mainly used in devices like the laptop, a support of the tablet computer, and etc. By taking the laptop as an example, the fixing component of the hinge is connected to a base of the laptop, and the spindle of the hinge is connected to an upper cover of the laptop, thus a user can open or close the upper cover.

However, a torsion of the hinge is already set in the factory, therefore, when the hinge has an overly large torsion, the user will have difficulty in rotating the hinge; and when the hinge has a too small torsion, the hinge may rotate automatically, which causes trouble for the user and reduces the user experience.

SUMMARY

A hinge includes a spindle, a spindle sleeve arranged with respect to the spindle, and a first material with a variable state arranged between the spindle and the spindle sleeve, wherein a torsion of the spindle is variable according to the variable state of the first material.

An electronic device includes a hinge, a first body and a second body, and the first body and the second body are rotatably connected via the hinge, the hinge includes a spindle, a spindle sleeve arranged with respect to the spindle, and a first material with a variable state arranged between the spindle and the spindle sleeve, wherein a torsion of the spindle is variable according to the variable state of the first material.

BRIEF DESCRIPTION OF THE DRAWINGS

For more clearly illustrating embodiments of the present application or the technical solution in the related technology, drawings referred to describe the embodiments or the related technology will be briefly described hereinafter. Apparently, the drawings in the following description are only several embodiments of the present application, and for the person skilled in the art other drawings may be obtained based on these drawings without any creative efforts.

DETAILED DESCRIPTION

The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the scope of the present application.

Figure 1:
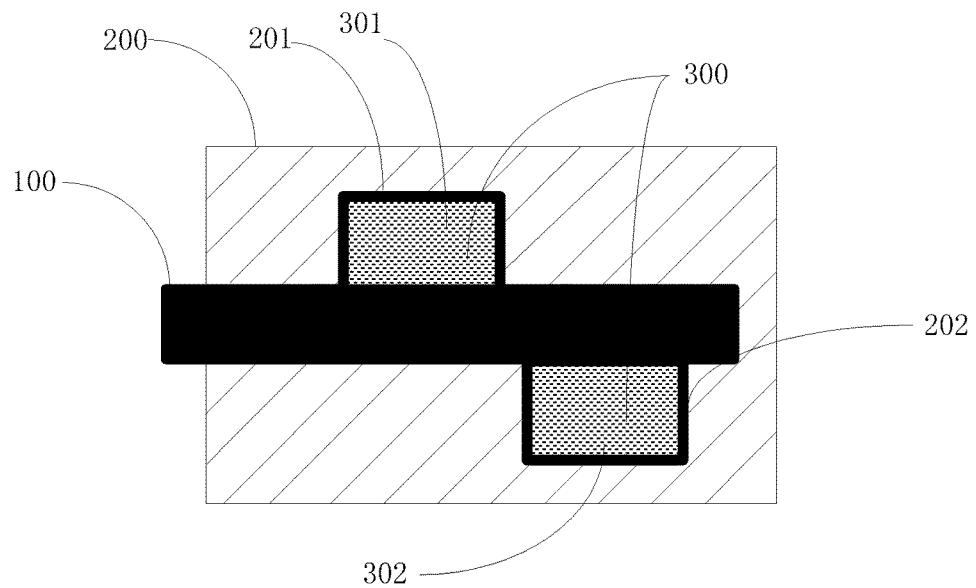
FIG. 1 is a longitudinally sectional schematic view showing the structure of a hinge according to an embodiment of present application.

A hinge is provided according to an embodiment of the present application, and as shown in FIG. 1, which is a longitudinal sectional view showing the structure of the hinge, the hinge includes a spindle 100, a spindle sleeve 200 and a first material 300. The spindle sleeve 200 is arranged with respect to the spindle 100. In detail, the spindle sleeve 200 is sleeved on the spindle 100.

The first material 300 has a variable state. The state of the first material may be a physical state of the first material. For example, the viscosity of the first material is variable between the minimum viscosity and the maximum viscosity; in a case that the first material has the minimum viscosity, the first material is in a liquid state, and in a case that the first material has the maximum viscosity, the first material is in a solid state.

The spindle sleeve 200 is provided with a concave pit, and the concave pit and the spindle define a cavity, and the first material 300 is arranged inside the cavity. In detail, the concave pit is formed on an inner surface of the spindle sleeve 200, and an enclosed space is formed by the concave pit on the inner surface of the spindle sleeve 200 and an outer surface of the spindle 100 when the spindle sleeve 200 is sleeved on the spindle 100, and the cavity is the enclosed space.

A number of the cavity is equal to a number of the concave pit on the inner surface of the spindle sleeve, and a shape of the cavity is determined by a shape of the concave pit on the inner surface of the spindle sleeve and a shape of a part of the outer surface of the spindle which forms the enclosed space with the concave pit.

In the present application, the shape of the spindle sleeve, the number and shape of the concave pit on the inner surface of the spindle sleeve, and the shape of the spindle may be set according to the practical situation, and are not limited in the present application.

A torsion of the spindle 100 is variable according to the variable state of the first material 300. The variable state of the first material 300 may include a first state and a second state. In a case that the variable state of the first material 300 is the first state, the torsion of the spindle 100 is a first level torsion, and in a case that the variable state of the first material 300 is the second state, the torsion of the spindle 100 is a second level torsion different from the first level torsion.

The torsion may be generated corresponding to a friction force between the first material 300 and the spindle 100. Also, the torsion may be generated corresponding to friction forces between the first material 300 and the spindle 100 as well as between the first material 300 and the spindle sleeve 200.

The hinge further includes a control device; and the control device is in contact with the first material, and is configured to control the first material to switch the variable state.

A hinge is further provided according to an embodiment of the present application, and as shown in FIG. 1, which is a longitudinal sectional view showing the structure of the hinge, the hinge includes a spindle 100, a spindle sleeve 200 and a first material 300. The spindle sleeve 200 is sleeved on the spindle 100.

It is to be noted that, the specific structure of the spindle 100 is not limited in the present application. For example, the spindle 100 may be of an I shape shown in FIG. 1, and for facilitate rotating, a part of the spindle 100 that is inserted in the spindle sleeve 200 may be of a cylindrical structure.

A state of the first material 300 is variable. Specifically, the state of the first material may be a physical state of the first material. For example, the viscosity of the first material is variable between the minimum viscosity and the maximum viscosity; in a case that the first material has the minimum viscosity, the first material is in a liquid state, and in a case that the first material has the maximum viscosity, the first material is in a solid state.

The first material 300 is arranged in a cavity, the cavity may be an enclosed space formed by a concave pit on an inner surface of the spindle sleeve 200 and an outer surface of the spindle 100 when the spindle sleeve 200 is sleeved on the spindle 100. Therefore, in the present application, a number of the cavity is equal to a number of the concave pit on the inner surface of the spindle sleeve, and a shape of the cavity is determined by a shape of the concave pit on the inner surface of the spindle sleeve and a shape of a part of the outer surface of the spindle which forms the enclosed space with the concave pit.

In the present application, the shape of the spindle sleeve, the number and shape of the concave pit on the inner surface of the spindle sleeve, and the shape of the spindle may be set according to the practical situation, and are not limited in the present application.

By taking FIG. 1 as an example, the inner surface of the spindle sleeve 200 is provided with a concave pit 201 and a concave pit 202; an enclosed space formed by the concave pit 201 and an outer surface of the spindle 100 is a cavity 301, and an enclosed space formed by the concave pit 202 and an outer surface of the spindle 100 is a cavity 302. The cavity 301 and the cavity 302 are both provided with the first material 300.

The first material has a first state and an Nth state which is different from the first state, and N is a positive integer greater than one. The first material can be switched between the first state and the Nth state, that is, the first material has N+1 states, and the first material is switchable among the N+1 states.

In a case that the first material is in the first state, a first level frictional force is generated between the first material in the first state and the spindle when the spindle rotates with respect to the spindle sleeve; and in a case that the first material is in the Nth state, an M level frictional force is generated between the first material in the Nth state and the spindle when the spindle rotates with respect to the spindle sleeve.

The frictional forces at different levels have different magnitudes, namely, the M level frictional force is different from the first level frictional force.

In embodiments of the present application, the hinge includes a first material having a variable state, the first material is arranged in a cavity, and the cavity is an enclosed space formed by the concave pit on the inner surface of the spindle sleeve and the outer surface of the spindle when the spindle sleeve is sleeved on the spindle. The first material has a first state and an Nth state which is different from the first state, and in a case that the first material is in the first state, a first level frictional force is generated between the first material and the spindle when the spindle rotates with respect to the spindle sleeve; and in a case that the first material is in the Nth state, an M level frictional force is generated between the first material and the spindle when the spindle rotates with respect to the spindle sleeve. Since the frictional force between the first material and the spindle can be equivalent to the torsion of the hinge, the hinge has variable torsions when the frictional forces are variable. Therefore, the torsion of the hinge in the present application changes with the state of the first material, which is easy to be adjusted by the user, and further improves the user experience.

Unlike the above embodiments, in this embodiment, the hinge further includes a control device. The control device is in contact with the first material, and is used to control the first material to switch between the first state and the Nth state, to change the frictional force between the first material in the corresponding state and the spindle.

The specific implementation of the first material is not limited herein as long as the state of the first material may be adjusted to change the frictional force between the first material and the spindle. As a specific implementation, the first material is an electrorheological fluid, and FIG. 2 shows a schematic view showing the specific structure of the hinge when the first material is the electrorheological fluid.

The hinge includes a spindle 100, a spindle sleeve 200, an electrorheological fluid 300 and a control device. The control device includes a first control circuit 401A, a first electrode plate 402A and a second electrode plate 402B.

The spindle sleeve 200 is sleeved on the spindle 100, and a state of the electrorheological fluid 300 is variable.

Figure 2:
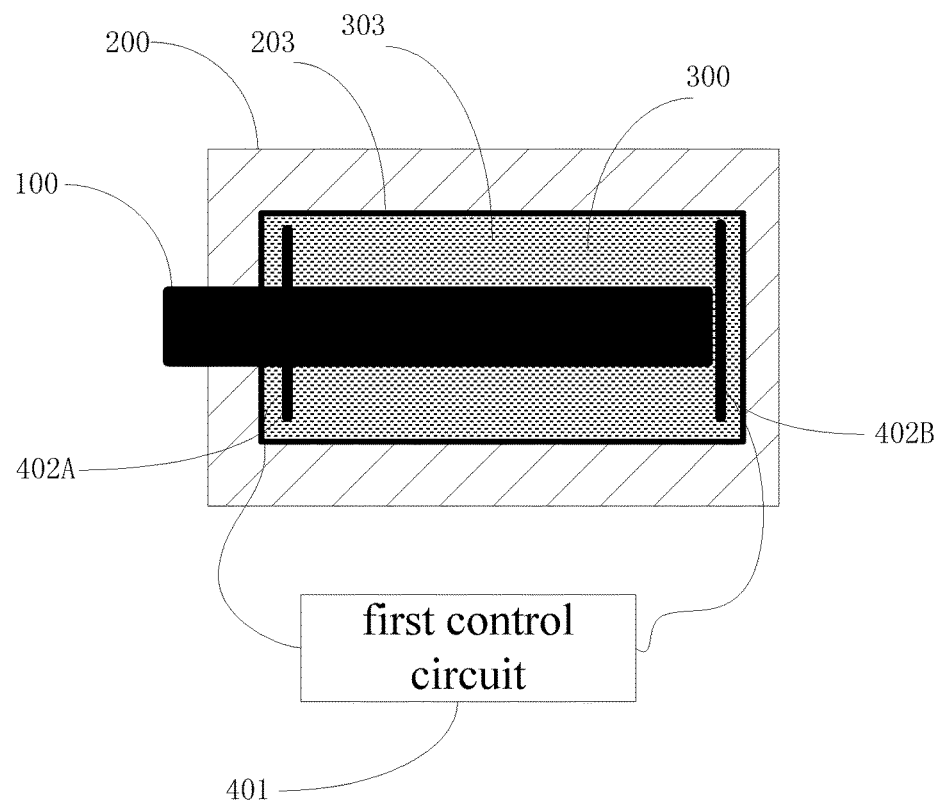
FIG. 2 is a schematic view showing the structure of a hinge according to another embodiment of the present application.

The electrorheological fluid 300 is arranged inside a cavity 303, and as shown in FIG. 2, the cavity 303 is an enclosed space formed by a concave pit 203 on an inner surface of the spindle sleeve 200 and an outer surface of the spindle 100 when the spindle sleeve 200 is sleeved on the spindle 100.

The electrorheological fluid has a first state and an Nth state which is different from the first state, and the electrorheological fluid is switchable between the first state and the Nth state. In a case that the electrorheological fluid is in the first state, a first level frictional force is generated between the electrorheological fluid 300 in the first state and the spindle 100 when the spindle 100 rotates with respect to the spindle sleeve 200; and in a case that the electrorheological fluid is in the Nth state, an M level frictional force is generated between the electrorheological fluid 300 in the Nth state and the spindle 100 when the spindle 100 rotates with respect to the spindle sleeve 200.

The M level frictional force is different from the first level frictional force.

The first electrode plate 402A and the second electrode plate 402B are both in contact with the electrorheological fluid 300.

The first control circuit 401A has a first output end connected to the first electrode plate 402A, and a second output end connected to the second electrode plate 402B. The first control circuit 401 is configured to allow the electrorheological fluid to switch between the first state and the Nth state by controlling an electric field intensity between the first electrode plate 402A and the second electrode plate 402B.

It is to be noted that, the electrorheological fluid has a characteristic that the viscosity thereof changes with the electric field intensity, that is, the smaller the electric field intensity is, the lower the viscosity of the electrorheological fluid is, and accordingly, the frictional force between the electrorheological fluid and the spindle is reduced. Correspondingly, the greater the electric field intensity is, the higher the viscosity of the electrorheological fluid is, and accordingly, the frictional force between the electrorheological fluid and the spindle is increased.

A correspondence relationship between the state of the electrorheological fluid and the frictional force is not limited in the present application. For example, when the electrorheological fluid switches from the first state to the Nth state, the frictional force between the electrorheological fluid in the corresponding state and the outer surface of the spindle may be gradually increased or gradually decreased.

For example, the electrorheological fluid has the maximum electric field intensity in the first state and the minimum electric field intensity in the Nth state. Accordingly, in a case that the electrorheological fluid is in the first state, the first level frictional force, generated between the electrorheological fluid in the first state and the spindle when the spindle rotates with respect to the spindle sleeve, is the maximum frictional force. And, in a case that the electrorheological fluid is in the Nth state, the M level frictional force, generated between the electrorheological fluid in the Nth state and the outer surface of the spindle when the spindle rotates with respect to the spindle sleeve, is the minimum frictional force, that is, the first level frictional force is greater than the M level frictional force.

For another example, the electrorheological fluid has the minimum electric field intensity in the first state and the maximum electric field intensity in the Nth state. Accordingly, in a case that the electrorheological fluid is in the first state, the first level frictional force generated between the electrorheological fluid in the first state and the spindle when the spindle rotates with respect to the spindle sleeve, is the minimum frictional force. And, in a case that the electrorheological fluid is in the Nth state, the M level frictional force generated between the electrorheological fluid in the Nth state and the outer surface of the spindle when the spindle rotates with respect to the spindle sleeve, is the maximum frictional force, that is, the first level frictional force is smaller than the M level frictional force.

Figure 3:
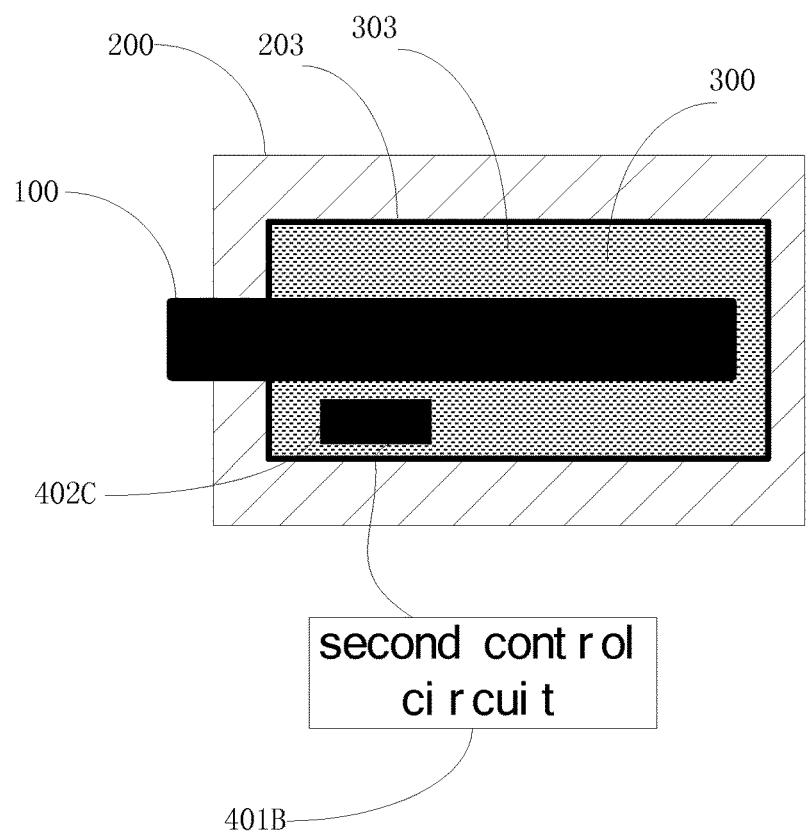
FIG. 3 is a schematic view showing the structure of a hinge according to yet another embodiment of the present application.

The first material may also be a magnetorheological fluid. As shown in FIG. 3, the hinge includes a spindle 100, a spindle sleeve 200, a magnetorheological fluid 300 and a control device. The control device includes a second control circuit 401B and a magnet 402C.

The spindle sleeve 200 is sleeved on the spindle 100, and a state of the magnetorheological fluid 300 is variable.

The magnetorheological fluid 300 is arranged inside a cavity 303, and as shown in FIG. 3, the cavity 303 is an enclosed space formed by a concave pit 203 on an inner surface of the spindle sleeve 200 and an outer surface of the spindle 100 when the spindle sleeve 200 is sleeved on the spindle 100.

The magnetorheological fluid has a first state and an Nth state which is different from the first state, and the magnetorheological fluid is switchable between the first state and the Nth state. In a case that the magnetorheological fluid is in the first state, a first level frictional force is generated between the magnetorheological fluid 300 in the first state and the spindle 100 when the spindle 100 rotates with respect to the spindle sleeve 200. In a case that the magnetorheological fluid is in the Nth state, an M level frictional force is generated between the magnetorheological fluid 300 in the Nth state and the spindle 100 when the spindle 100 rotates with respect to the spindle sleeve 200.

The M level frictional force is different from the first level frictional force.

The magnet 402C is in contact with the magnetorheological fluid 300.

The second control circuit 401B has an output end connected to the magnet 402C, and the second control circuit 401B is configured to allow the magnetorheological fluid to switch between the first state and the Nth state by controlling a magnetic field intensity generated by the magnet 402C.

It should be noted that, the magnetorheological fluid has a characteristic that the fluidity thereof changes with the magnetic field intensity, that is, the smaller the magnetic field intensity is, the greater the fluidity of the magnetorheological fluid is, and accordingly, the frictional force between the magnetorheological fluid and the spindle is reduced. Correspondingly, the greater the magnetic field intensity is, the smaller the fluidity of the magnetorheological fluid is, and accordingly, the frictional force between the magnetorheological fluid and the spindle is increased.

A correspondence relationship between the state of the magnetorheological fluid and the frictional force is not limited in the present application. For example, when the magnetorheological fluid switches from the first state to the Nth state, the frictional force between the magnetorheological fluid in the corresponding state and the spindle may be gradually increased or gradually decreased.

For example, the magnetorheological fluid has the maximum magnetic field intensity in the first state and the minimum magnetic field intensity in the Nth state. Correspondingly, in a case that the magnetorheological fluid is in the first state, the first level frictional force, generated between the magnetorheological fluid in the first state and the spindle when the spindle rotates with respect to the spindle sleeve, is the minimum frictional force. In a case that the magnetorheological fluid is in the Nth state, the M level frictional force, generated between the magnetorheological fluid in the Nth state and the spindle when the spindle rotates with respect to the spindle sleeve, is the maximum frictional force, that is, the first level frictional force is smaller than the M level frictional force.

For another example, the magnetorheological fluid has the minimum magnetic field intensity in the first state and has the maximum magnetic field intensity in the Nth state. Accordingly, in a case that the magnetorheological fluid is in the first state, the first level frictional force, generated between the magnetorheological fluid in the first state and the spindle when the spindle rotates with respect to the spindle sleeve, is the minimum frictional force. In a case that the magnetorheological fluid is in the Nth state, the M level frictional force, generated between the magnetorheological fluid in the Nth state and the spindle when the spindle rotates with respect to the spindle sleeve, is the maximum frictional force, that is, the first level frictional force is smaller than the M level frictional force.

As described in the above embodiments, the number and shape of the concave pit on the inner surface of the spindle sleeve both are not limited in the embodiments of the present application.

Figure 4:
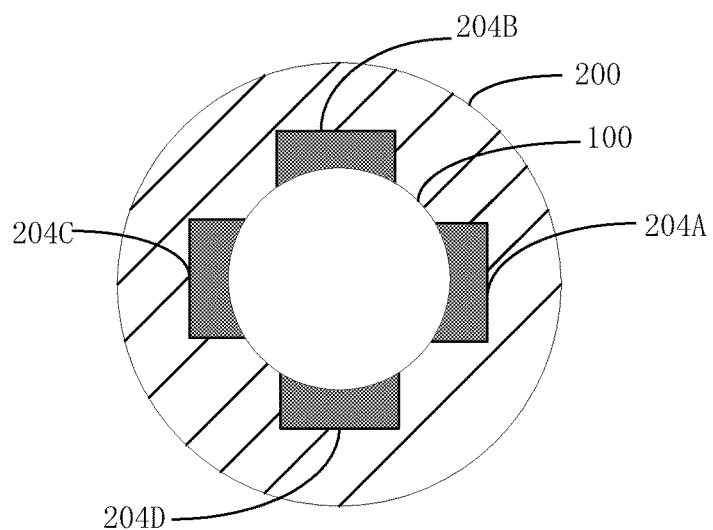
FIG. 4 is a transversely sectional view showing the structure of a hinge according to an embodiment of the present application.
Figure 5:
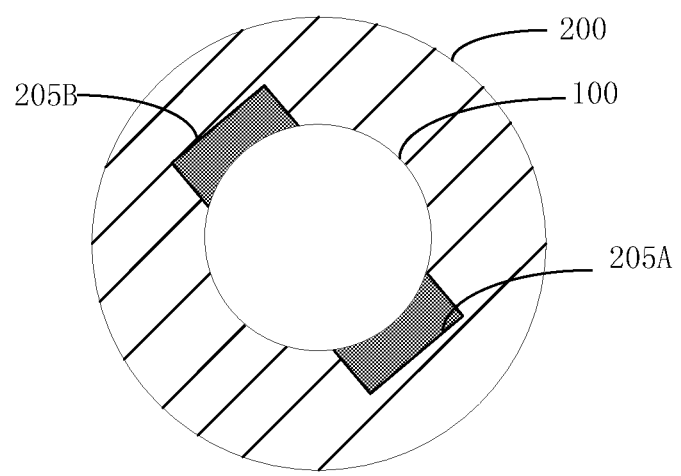
FIG. 5 is a transversely sectional view showing the structure of a hinge according to another embodiment of the present application.

As an implementation, the inner surface of the spindle sleeve may be provided with at least one concave pit, and accordingly, the cavity may be an enclosed space formed by each concave pit in the at least one concave pit and the outer surface of the spindle when the spindle sleeve is sleeved on the spindle. FIGS. 4 and 5 are transversely sectional schematic views respectively showing implementations of the hinge.

In FIG. 4, the inner surface of the spindle sleeve 200 is provided with four concave pits, which are a concave pit 204A, a concave pit 204B, a concave pit 204C and a concave pit 204D. The cavity may be enclosed spaces formed by each concave pit in the four concave pits and the outer surface of the spindle when the spindle sleeve is sleeved on the spindle. Specifically, one enclosed space is formed by the concave pit 204A and the outer surface of the spindle 100, one enclosed space is formed by the concave pit 204B and the outer surface of the spindle 100, one enclosed space is formed by the concave pit 204C and the outer surface of the spindle 100, and one enclosed space is formed by the concave pit 204D and the outer surface of the spindle 100.

In FIG. 5, the inner surface of the spindle sleeve 200 is provided with two concave pits, which are a concave pit 205A and a concave pit 205B. The cavity may be enclosed spaces formed by each concave pit in the two concave pits and the outer surface of the spindle when the spindle sleeve is sleeved on the spindle. Specifically, one enclosed space is formed by the concave pit 205A and the outer surface of the spindle 100, and one enclosed space is formed by the concave pit 205B and the outer surface of the spindle 100.

Figure 6:
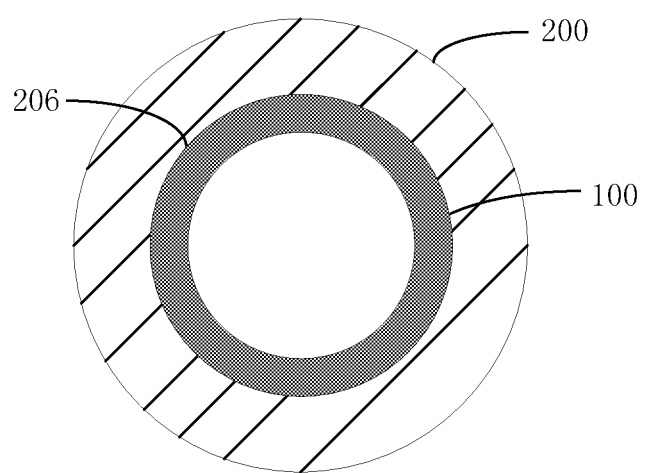
FIG. 6 is a transversely sectional view showing the structure of a hinge according to another embodiment of the present application.

In another implementation, the inner surface of the spindle sleeve may be provided with a concave pit of a circumferential annular structure. Accordingly, the cavity may be an enclosed space formed by the concave pit of the circumferential annular structure and the outer surface of the spindle when the spindle sleeve is sleeved on the spindle. FIG. 6 is a transversely sectional schematic view showing the structure of the hinge in another implementation.

In FIG. 6, the inner surface of the spindle sleeve 200 is provided with a concave pit 206 of a circumferential annular structure. The cavity is an enclosed space formed by the concave pit 206 of the circumferential annular structure and the outer surface of the spindle 100 when the spindle sleeve 200 is sleeved on the spindle 100.

It should be noted that, a longitudinal width and a transverse length of the concave pit 206 of the circumferential annular structure arranged on the inner surface of the spindle sleeve 200 are not limited in the present application, and may be set according to the practical conditions. As an implementation, referring to FIG. 2, the concave pit on the inner surface of the spindle sleeve 200 in FIG. 2 is the concave pit of the circumferential annular structure.

Figure 7:
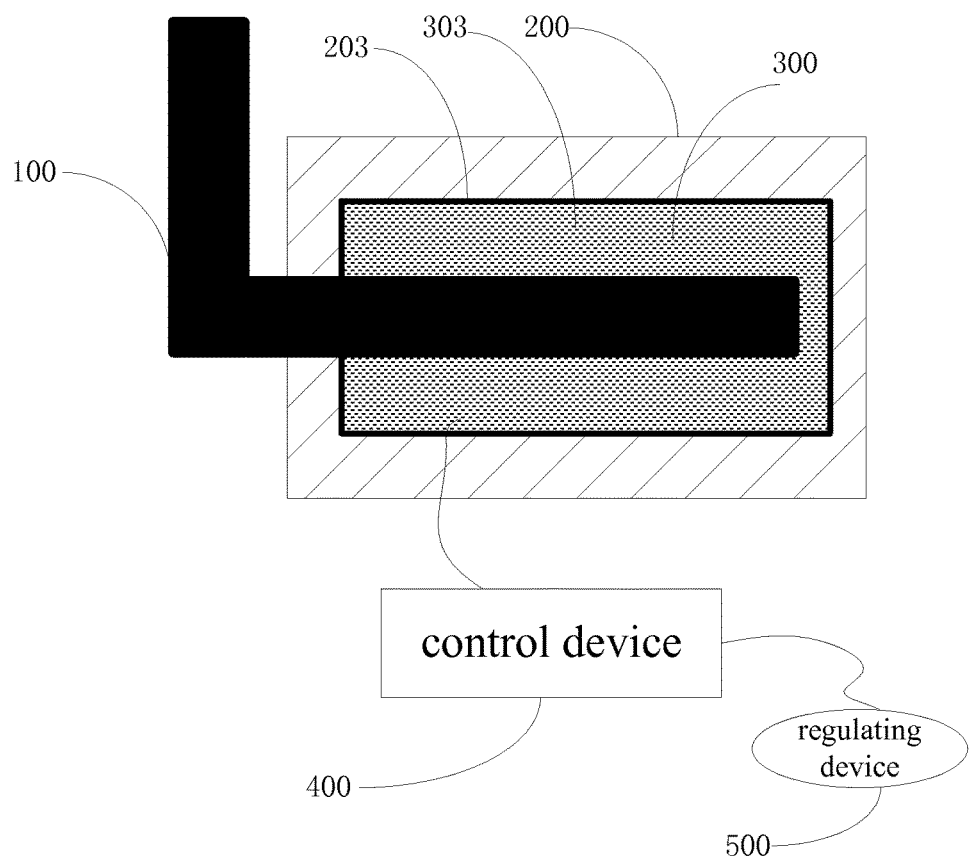
FIG. 7 is a schematic view showing the structure of a hinge according to another embodiment of the present application.

A hinge is provided according to another embodiment of the present application, and as shown in FIG. 7, which is a schematic view showing the structure of the hinge, the hinge includes a spindle 100, a spindle sleeve 200, a first material 300, a control device 400 and a regulating component 500.

The spindle sleeve is sleeved on the spindle 100.

The spindle 100 in FIG. 7 is of an L-shaped structure, and with such design, the spindle 100 is easy to be connected to other components.

The first material 300 has a variable state, and is arranged inside a cavity. The cavity may be an enclosed space formed by a concave pit on an inner surface of the spindle sleeve 200 and an outer surface of the spindle 100 when the spindle sleeve 200 is sleeved on the spindle 100.

The first material has a first state and an Nth state which is different from the first state, and N is a positive integer greater than one. The first material is switchable between the first state and the Nth state, that is, the first material has N+1 states, and the first material is switchable among the N+1 states.

In a case that the first material is in the first state, a first level frictional force is generated between the first material in the first state and the spindle when the spindle rotates with respect to the spindle sleeve; and in a case that the first material is in the Nth state, an M level frictional force is generated between the first material in the Nth state and the spindle when the spindle sleeve rotates with respect to the spindle.

The frictional forces at different levels have different magnitudes, that is, the M level frictional force is different from the first level frictional force.

The control device 400 is in contact with the first material 300, and the regulating component 500 is connected to the control device 400.

In practical applications, the user may adjust the frictional force between the first material and the spindle through the regulating component according to practical needs. The regulating component may generate a regulating instruction corresponding to an operation of the user and sends the regulating instruction to the control device. The control device may control the first material to switch between the first state and the Nth state according to the regulating instruction from the regulating component, thereby accordingly changing the frictional force between the first material in the corresponding state and the outer surface of the spindle.

It should be noted that, in the present application, a correspondence relationship between the state of the first material and the frictional force is not limited. For example, when the first material switches from the first state to the Nth state, the frictional force between the first material and the outer surface of the spindle may be gradually increased or gradually decreased.

To facilitate understanding, a specific example is described as an example. Supposed that the first material have five variable states, including a first state, a second state, a third state, a fourth state and a fifth state.

In one case, when the first material switches from the first state to the fifth state, the frictional force between the first material and the outer surface of the spindle is increased gradually. Supposed that the first state corresponds to a first level frictional force, the second state corresponds to a second level frictional force, the third state corresponds to a third level frictional force, the fourth state corresponds to a fourth level frictional force, and the fifth state corresponds to a fifth level frictional force, a relationship of the five levels of the frictional forces is as follows:

The first level frictional force<the second level frictional force<the third level frictional force<the fourth level frictional force<the fifth level frictional force.

In another case, when the first material switches from the first state to the fifth state, the frictional force between the first material and the outer surface of the spindle is decreased gradually. Supposed that the first state corresponds to a first level frictional force, the second state corresponds to a second level frictional force, the third state corresponds to a third level frictional force, the fourth state corresponds to a fourth level frictional force, and the fifth state corresponds to a fifth level frictional force, a relationship of the five levels of the frictional forces is as follows:

The first level frictional force>the second level frictional force>the third level frictional force>the fourth level frictional force>the fifth level frictional force.

Figure 8:
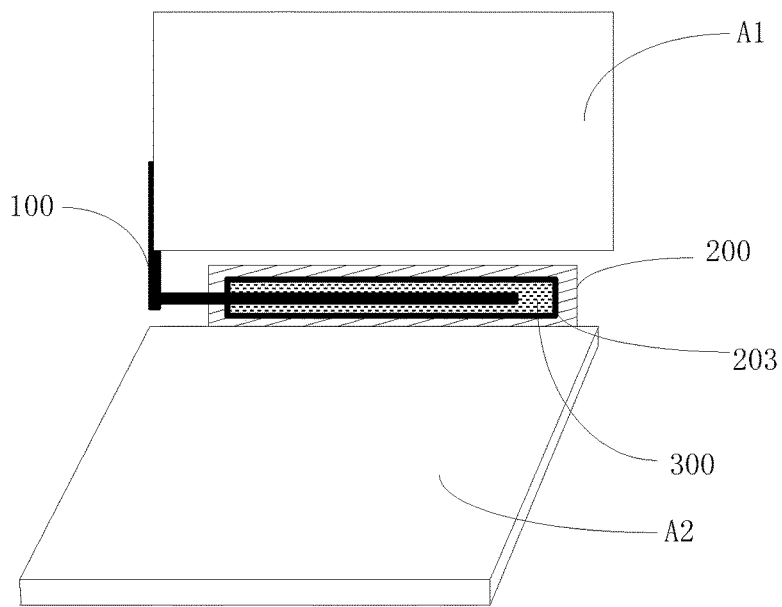
FIG. 8 is a schematic view showing the structure of an electronic device according to an embodiment of the present application.

An electronic device is further provided according to an embodiment of the present application. As shown in FIG. 8, the electronic device may include a first body A1, a second body A2 and a hinge.

The first body A1 and the second body A2 are rotatably connected via the hinge.

The hinge includes a spindle 100, a spindle sleeve 200 and a first material 300. The spindle sleeve 200 is arranged with respect to the spindle 100. In detail, the spindle sleeve 200 is sleeved on the spindle 100.

The first material 300 has a variable state. The spindle sleeve 200 is provided with a concave pit, and the concave pit and the spindle 100 define a cavity, and the first material 300 is arranged inside the cavity. In detail, the concave pit is formed on an inner surface of the spindle sleeve 200, and an enclosed space is formed by the concave pit on the inner surface of the spindle sleeve 200 and an outer surface of the spindle 100 when the spindle sleeve 200 is sleeved on the spindle 100, and the cavity is the enclosed space.

A torsion of the spindle 100 is variable according to the variable state of the first material 300. The variable state of the first material 300 may include a first state and a second state. In a case that the variable state of the first material 300 is the first state, the torsion of the spindle 100 is a first level torsion, and in a case that the variable state of the first material 300 is the second state, the torsion of the spindle 100 is a second level torsion different from the first level torsion.

The torsion may be generated corresponding to a friction force between the first material 300 and the spindle 100. Also, the torsion may be generated corresponding to friction forces between the first material 300 and the spindle 100 as well as between the first material 300 and the spindle sleeve 200.

As one connection relationship between the first body and the hinge as well as between the second body and the hinge, which is shown in FIG. 1, the first body A1 is connected to the spindle 100 of the hinge, and the second body A2 is connected to the spindle sleeve 200 of the hinge. Of course, as another connection, the first body A1 is connected to the spindle sleeve 200 of the hinge, and the second body A2 is connected to the spindle 100 of the hinge.

The hinge further includes a control device; and the control device is in contact with the first material, and is configured to control the first material to switch the variable state.

An electronic device is further provided according to an embodiment of the present application. As shown in FIG. 8, the electronic device may include a first body A1, a second body A2 and a hinge.

The first body A1 and the second body A2 are rotatably connected via the hinge.

The hinge may include a spindle 100, a spindle sleeve 200 and a first material 300.

The first material 300 has a variable state, and is arranged inside a cavity. The cavity may be an enclosed space formed by a concave pit 203 on an inner surface of the spindle sleeve 200 and an outer surface of the spindle 100 when the spindle sleeve 200 is sleeved on the spindle 100.

The first material has a first state and an Nth state which is different from the first state. The first material is switchable between the first state and the Nth state, and N is a positive integer greater than one. In a case that the first material is in the first state, a first level frictional force is generated between the first material in the first state and the spindle when the spindle rotates with respect to the spindle sleeve. In a case that the first material is in the Nth state, an M level frictional force is generated between the first material in the Nth state and the spindle when the spindle rotates with respect to the spindle sleeve. The M level frictional force is different from the first level frictional force.

As one connection relationship between the first body and the hinge as well as between the second body and the hinge, which is shown in FIG. 1, the first body A1 is connected to the spindle 100 of the hinge, and the second body A2 is connected to the spindle sleeve 200 of the hinge. Of course, as another connection, the first body A1 is connected to the spindle sleeve 200 of the hinge, and the second body A2 is connected to the spindle 100 of the hinge.

In embodiments of the present application, the first body and the second body of the electronic device are rotatably connected via the hinge, the hinge includes a first material with a variable state, and the hinge is configured to change the frictional force between the first material and an outer surface of the spindle by adjusting the state of the first material. Since the frictional force between the first material and the spindle may be equivalent to the torsion of the hinge, and the hinge has different torsions when the frictional forces are different. Therefore, the torsion of the hinge of the electronic device in the present application may change with the state of the first material, which is easy to be adjusted by the user, and further improves the user experience.

Unlike the above embodiments, in the present embodiment, the hinge further includes a control device. The control device is in contact with the first material, and is used for controlling the first material to switch between the first state and the Nth state.

It should be noted that, the first material is not limited in the present application. For example, the first material may be an electrorheological fluid or a magnetorheological fluid. In a case that the first material is embodied as the electrorheological fluid, a structure of the control device may refer to the above embodiment corresponding to FIG. 2. In a case that the first material is the magnetorheological fluid, the structure of the control device may refer to the above embodiment corresponding to FIG. 3. The structure of the control device will not be described in details herein.

In practical application, there are various types of electronic devices that using hinges, for example a foldable electronic device, namely the laptop commonly used by the user. In this case, corresponding to the above embodiment, the first body may be a display screen, the second body may be a base arranged with a keyboard, and the display screen and the base may rotate with respect to each other through the hinge.

In the case that the electronic device is embodied as a tablet computer arranged with a support, the first body may be a body of the tablet computer, the second body may be the support, and the body of the tablet computer and the support may rotate with respect to each other through the hinge.

In the case that the electronic device is embodied as a flip tablet computer, the first body may be a body of the tablet computer, the second body may be a base arranged with a keyboard, and the body of the tablet computer and the base arranged with the keyboard may rotate with respect to each other through the hinge.

It should be noted that, for the electronic device in the present application, the torsion of hinge may be adjusted manually by the user, or be adjusted automatically.

In a case that the electronic device can adjust the torsion of the hinge automatically, as an implementation, the electronic device may further include a first detection device based on the above embodiments.

The first detection device is connected to the control device. The control device is configured to control the hinge to provide a first level target frictional force when the first detection device detects that the first body is performing an action moving away from the second body, and to control the hinge to provide a second level target frictional force when the first detection device detects that the first body is in a state away from the second body.

The first level target frictional force is smaller than the second level target frictional force.

To facilitate understanding, a specific example is illustrated herein, supposed that the electronic device is a foldable laptop, the first body is a display screen, the second body is a base provided with a keyboard. A current state of the foldable laptop is a closed state that the display screen abuts against the base, and when the user manually adjust the display screen to move the display screen away from the base gradually, the first detection device detects that the first body is performing an action moving away from the second body. Then for facilitate the user adjusting the torsion of the hinge, the control device may control the hinge of the electronic device to provide a small torsion, that is, control the hinge to provide a first level target frictional force. When the user stop adjusting the display screen to move the display screen away from the base, the first detection device detects that the first body is in a state away from the second body, and in this case, to ensure that the first body maintains the state away from the second body, the control device may control the hinge of the electronic device to provide a greater torsion, that is, control the hinge to provide a second level target frictional force. That is, the first level target frictional force is smaller than the second level target frictional force.

Correspondingly, the electronic device may further include a second detection device.

The second detection device is connected to the control device. The control device here is configured to control the hinge to provide a third level target frictional force when the second detection device detects that the first body is performing an action moving closing to the second body, and to control the hinge to provide a fourth level target frictional force when the second detection device detects that the first body is in a state close to the second body.

The third level target frictional force is smaller than the fourth level target frictional force.

In a case that the electronic device is embodied as a foldable laptop, the first body is a display screen, the second body is a base provided with a keyboard, and a current state of the foldable laptop is an open state that the display screen is away from the base. When the user manually adjusts the display screen to move the display screen close to the base gradually, the second detection device detects that the first body is performing an action moving close to the second body. Then, to facilitate the user to adjust the torsion of the hinge, the control device may control the hinge of the electronic device to provide a small torsion, that is, control the hinge to provide the third level target frictional force. When the user stops adjusting the display screen to move the display screen close to the base, the second detection device detects that the first body is in a state close to the second body, and in this case, to ensure that the first body maintains the state close to the second body, the control device may control the hinge of the electronic device to provide a greater torsion, that is, control the hinge to provide a fourth level target frictional force. That is, the third level target frictional force is smaller than the fourth level target frictional force.

It should be noted that, in the above embodiments, the state, away from the second body, of the first body, and the state, close to the second body, of the first body are both relative.

For the above embodiments, the first detection device and the second detection device may both be a sensor, however the specific implementations thereof are not limited in the present application. For example, the first detection device may be a pressure sensor, and may be arranged at an edge of a first surface of the first body, and the first surface is a surface of the first body which is in contact with the second body when the first body abuts against the second body. When the user adjusts the first body to move the first body away from the second body, fingers of the user may generally touch the edge of the first body and apply a relative large pressure on the first surface of the first body, then when a pressure value detected by the first detection device is greater than a predetermined pressure value, it can be determined that the first body is performing the action of moving away from the second body. When the user stops adjusting the first body to move the first body away from the second body, fingers of the user may leave the edge of the first body, then when the pressure value detected by the first detection device is decreased or even is zero, it can be determined that the first body is in the state away from the second body.

Accordingly, the second detection device may also be a pressure sensor, and may be arranged on an edge of a second surface of the first body, and the second surface is a surface opposite to the first surface of the first body. When the user adjusts the first body to move the first body close to the second body, fingers of the user may usually touch the edge of the first body and apply a relative large pressure on the second surface of the first body, then when a pressure value detected by the second detection device is greater than a predetermined pressure value, it can be determined that the first body is performing the action of moving close to the second body. When the user stops adjusting the first body to move the first body close to the second body, fingers of the user may leave the edge of the first body, then when the pressure value detected by the second detection device is decreased or even is zero, it can be determined that the first body is in a state close to the second body.

It should be noted that, other sensors capable of detecting the state of the electronic device all fall into the scope of the present application. For example, the first detection device and the second detection device may both be an optical sensor, which is configured to determine the state of the first body with respect to the second body by detecting the change of ambient light.

As another implementation of the manner of the electronic device for adjusting the torsion of the hinge automatically, the electronic device further includes a third detection device. The control device is connected to the third detection device, and is configured to control the hinge to provide a fifth level target frictional force when the third detection device detects that the first body and the second body are in a first static mode, and to control the hinge to provide a sixth level target frictional force when the third detection device detects that the first body and the second body are in a second static mode.

The first body and the second body form a first angle in the first static mode, and form a second angle in the second static mode. The first angle and the second angle are different, and the fifth level target frictional force is different from the sixth level target frictional force.

The electronic device may have various static modes, and the angle formed between the first body and the second body is different in different static modes. The control device may control the hinge to provide different frictional forces in different static modes.

The first static mode and the second static mode may be set according to the practical condition and are not limited in the present application. For example, a mode when an included angle between the first body and the second body is zero degree is the first static mode, and a mode when the included angle between the first body and the second body is 45 degree is the second static mode.

The specific implementation of the third detection device is not limited in the present application. For example, the third detection device may be an angular transducer.

The above embodiments are described in a progressive manner. Each of the embodiments is mainly focused on describing its differences from other embodiments, and references may be made among these embodiments with respect to the same or similar portions among these embodiments. The device according to the embodiments is simply described since the device is corresponding to the method according to the embodiments, and the corresponding part of the device may be referred to the description of the method.

Based on the above description of the disclosed embodiments, the person skilled in the art is capable of carrying out or using the present application. It is obvious for the person skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

What is claimed is:

1. A hinge, comprising:
    a spindle;
    a spindle sleeve arranged with respect to the spindle; and
    a first material with a variable state, the first material being arranged between the spindle and the spindle sleeve,
    wherein a torsion of the spindle is variable according to the variable state of the first material;
    the hinge further comprises a control device, the control device being in contact with the first material, and being configured to control the first material to switch the variable state; and
    the first material is an electrorheological fluid, and the control device comprises:
        a first electrode plate and a second electrode plate that are each in contact with the electrorheological fluid; and
        a first control circuit having a first output end connected to the first electrode plate, and a second output end connected to the second electrode plate; and
        the first control circuit is configured to switch the variable state of the electrorheological fluid by controlling an electric field intensity between the first electrode plate and the second electrode plate.

2. The hinge according to claim 1, wherein in a case that the variable state is a first state, the torsion of the spindle is a first level torsion, and in a case that the variable state is a second state, the torsion of the spindle is a second level torsion different from the first level torsion.

3. The hinge according to claim 1, wherein the torsion is generated corresponding to a friction force between the first material and the spindle.

4. The hinge according to claim 1, wherein the torsion is generated corresponding to friction forces between the first material and the spindle as well as between the first material and the spindle sleeve.

5. The hinge according to claim 1, wherein the spindle sleeve comprises at least one concave pit, and the at least one concave pit and the spindle define at least one cavity, and the first material is arranged inside the at least one cavity.

6. The hinge according to claim 5, wherein the at least one concave pit is formed on an inner surface of the spindle sleeve, and the cavity is an enclosed space formed by the at least one concave pit on the inner surface of the spindle sleeve and an outer surface of the spindle.

7. The hinge according to claim 5, wherein
    the inner surface of the spindle sleeve is provided with a concave pit of a circumferential annular structure, and the cavity is an enclosed space formed by the concave pit of the circumferential annular structure and the outer surface of the spindle.

8. The hinge according to claim 1, wherein the first material is a magnetorheological fluid; and the control device comprises:
    a magnet in contact with the magnetorheological fluid; and
    a second control circuit having an output end connected to the magnet; and
    the second control circuit is configured to switch the variable state of the magnetorheological fluid by controlling a magnetic field intensity generated by the magnet.

9. The hinge according to claim 1, further comprising:
    a regulating component connected to the control device; and
    the control device is configured to control the first material to switch the variable state according to a regulating instruction sent by the regulating component.

10. An electronic device, comprising a hinge, a first body and a second body; wherein,
    the first body and the second body are rotatably connected via the hinge;
    the hinge comprises:
        a spindle;
        a spindle sleeve arranged with respect to the spindle; and
        a first material with a variable state arranged between the spindle and the spindle sleeve;
    wherein a torsion of the spindle is variable according to the variable state of the first material;

the hinge further comprises a control device, the control device being in contact with the first material, and being configured to control the first material to switch the variable state; and the first material is an electrorheological fluid, and the control device comprises:
- a first electrode plate and a second electrode plate that are each in contact with the electrorheological fluid; and
- a first control circuit having a first output end connected to the first electrode plate, and a second output end connected to the second electrode plate; and
- the first control circuit is configured to switch the variable state of the electrorheological fluid by controlling an electric field intensity between the first electrode plate and the second electrode plate.

11. The electronic device according to claim 10, wherein in a case that the variable state is a first state, the torsion of the spindle is a first level torsion, and in a case that the variable state is a second state, the torsion of the spindle is a second level torsion different from the first level torsion.

12. The electronic device according to claim 10, wherein the torsion is generated corresponding to a friction force between the first material and the spindle.

13. The electronic device according to claim 10, wherein the torsion is generated corresponding to friction forces between the first material and the spindle as well as between the first material and the spindle sleeve.

14. The electronic device according to claim 10, wherein the spindle sleeve comprises at least one concave pit, and the at least one concave pit and the spindle define at least one cavity, and the first material is arranged inside the at least one cavity.

15. The electronic device according to claim 10, wherein the electronic device further comprises a first detection device;

the control device is configured to control the hinge to provide a first level target frictional force in a case that the first detection device detects that the first body is performing an action of moving away from the second body; and the control device is configured to control the hinge to provide a second level target frictional force in a case that the first detection device detects that the first body is in a state away from the second body; and the first level target frictional force is smaller than the second level target frictional force.

16. The electronic device according to claim 10, wherein the electronic device further comprises a second detection device;

the control device is configured to control the hinge to provide a third level target frictional force in a case that the second detection device detects that the first body is performing an action of moving close to the second body;

the control device is configured to control the hinge to provide a fourth level target frictional force in a case that the second detection device detects that the first body is in a state close to the second body; and the third level target frictional force is smaller than the fourth level target frictional force.

17. The electronic device according to claim 10, wherein the electronic device further comprises a third detection device;

the control device is configured to control the hinge to provide a fifth level target frictional force in a case that the third detection device detects that the first body and the second body are in a first static mode;

the control device is configured to control the hinge to provide a sixth level target frictional force in a case that the third detection device detects that the first body and the second body are in a second static mode;

the first body and the second body form a first angle in the first static mode, and form a second angle in the second static mode; and the first angle is different from the second angle, and the fifth level target frictional force is different from the sixth level target frictional force.

* * * * *